Aug. 26, 1930.　　　　W. H. DAY　　　　1,774,229
INDEX OR FILE
Filed Nov. 11, 1924　　　2 Sheets-Sheet 1

Inventor
William H. Day
By Henry E. Pocknell
Attorney

Aug. 26, 1930.  W. H. DAY  1,774,229
INDEX OR FILE
Filed Nov. 11, 1924   2 Sheets-Sheet 2
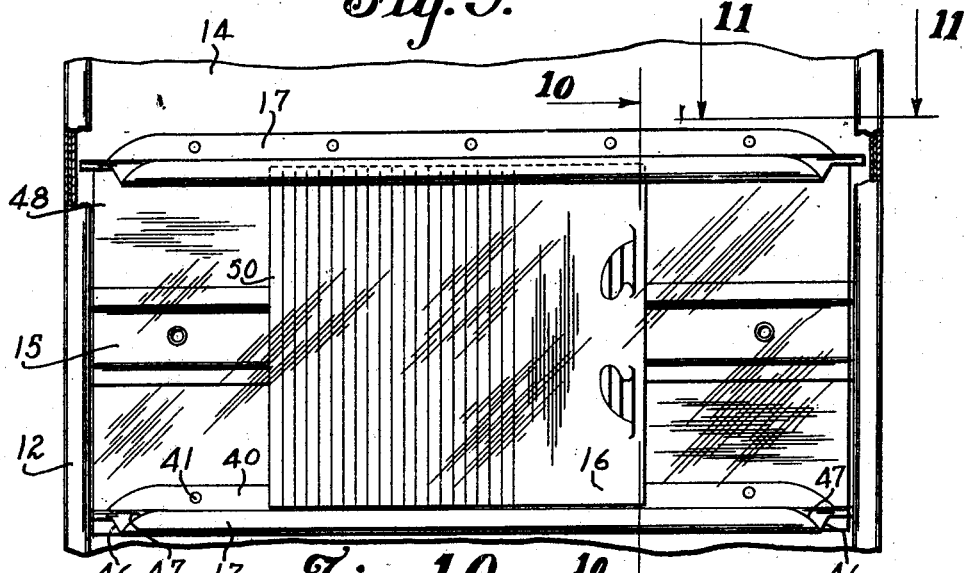
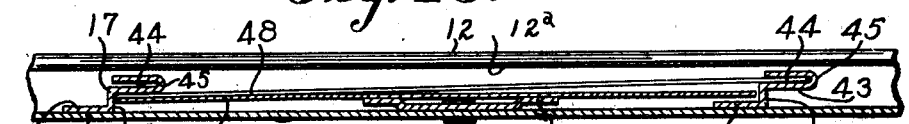
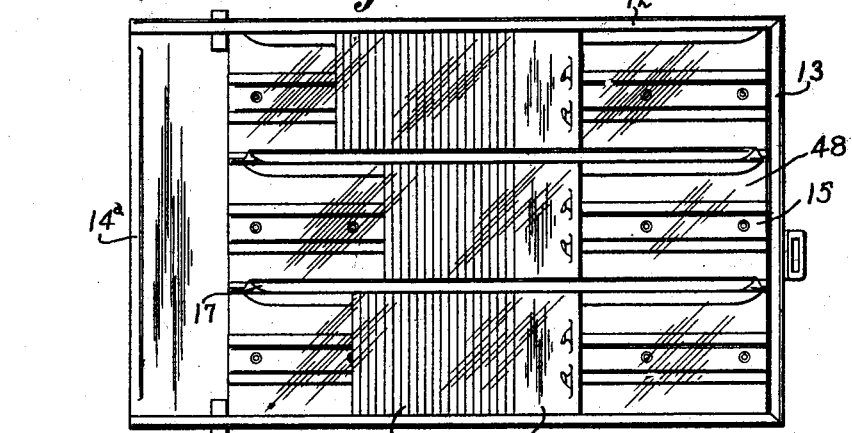
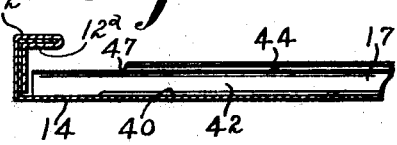
Inventor
William H. Day
By Henry E. Rockwell
Attorney Patented Aug. 26, 1930

1,774,229

UNITED STATES PATENT OFFICE

WILLIAM H. DAY, OF EAST HAVEN, CONNECTICUT, ASSIGNOR, BY MESNE ASSIGNMENTS, TO REMINGTON RAND INC., OF NEW YORK, N. Y., A CORPORATION OF DELAWARE

INDEX OR FILE

Application filed November 11, 1924. Serial No. 749,196.

This invention relates to index files or similar equipment, wherein a record-carrying member is employed generally in the form of a shallow drawer or tray, capable of being stored away in a device in the form of a cabinet, and conveniently arranged for withdrawal therefrom in order to readily refer to the cards or sheets filed therein.

More particularly the invention relates to such an equipment using the type of index cards that lie substantially flatwise in the drawers in overlapped relation, whereby the margin of each is exposed to view, especially the type of index cards of the class shown in the Fisher Patent No. 1,048,056, granted December 24, 1912.

An index equipment such as that noted above, is shown in a co-pending application, Serial No. 669,525, of which this application in certain aspects is a continuation in part. This application relates, however, more specifically to an improved form of drawer or tray, adapted for use with such an equipment, and wherein novel filing and indexing means are provided.

In devices of this character, it is preferable to provide shallow sheet-metal drawers or trays, having facilities for holding a comparatively large number of index cards, in order that the size of the cabinet may be held within reasonable and minimum dimensions. The cabinets are adapted for general use in offices and elsewhere, and are arranged in such a manner that they may be placed in any handy location for ready reference, such as being placed upon the floor, table or desk, or even hung or placed beneath a table or desk. Due to the possible use of this equipment in various locations, the drawers or trays must be of such construction that they will be readily adapted to the location wherever the cabinet is placed. The facilities for holding a comparatively large number of index cards, contained in each drawer, should be of such construction and arrangement that the index cards are held compactly and free from possible injury.

Being stored away within the cabinet, it is essential that insignia of some kind be provided whereby the contents of each drawer may be noted at a glance, regardless of the location in which the cabinet is placed. Being shallow and usually stored in a cabinet wherein the front faces of the drawer are flush with or sunk beneath the front face of the cabinet, a suitable handle for withdrawing the same is necessary, especially one which will not interfere with the withdrawal of adjacent drawers.

One object, therefore, of this invention is to provide an index-receiving drawer or tray of shallow form, having facilities for holding a comparatively large number of cards compactly together, without danger of injury to the same due to interference of other cards in the same drawer, from the drawers above or below, or from foreign matter, such as dust or finger marks due to handling.

Another object of this invention is the provision for use in such a drawer, of novel means for compactly holding a series of cards therein, by the engagement thereof with the card edges, while being capable of retaining a covering, preferably of a transparent nature, over the series of cards.

Another object of my invention, is to provide a handle member for a drawer or tray which will be particularly adapted for use with such an equipment.

Another object of my invention is to provide a tab or insignia-holding member, which may be advantageously used with such an equipment and readily referred to, regardless of the location of the cabinet with respect to the user.

Another object of the invention is to combine such a handle and such a tab or insignia-holding device in such a manner that the advantages of each will be retained.

Still other objects of the invention comprise the provision of a drawer in which index cards may be readily filed, which is constructed wholly of sheet-metal, adapted for use in restricted vertical spaces, and which is inexpensive to manufacture, and to provide such a drawer with a handle member also of sheet metal and being a one-piece structure which may be easily applied to the front plate of the drawer, and which also is inexpensive to manufacture.

To these and other ends, my invention consists in the novel features and combination of parts to be hereinafter described and claimed.

In the accompanying drawings:

Fig. 9 is an enlarged plan view of a portion of a drawer embodying the features of this invention;

Fig. 10 is a section on line 10—10 of Fig. 9;

Fig. 11 is a section on line 11—11 of Fig. 9, and,

Fig. 12 is a view showing a modified arrangement of the filing facilities in a somewhat similar drawer.

Figure 2:
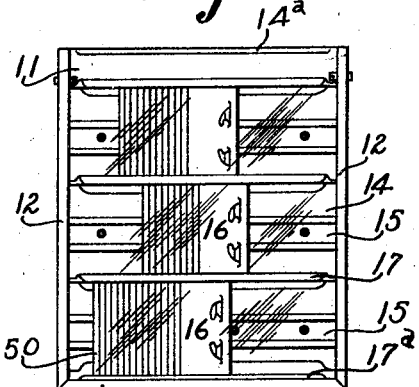
Fig. 2 is a plan view of a drawer or tray embodying the features of this invention.
Figures 3, 4:
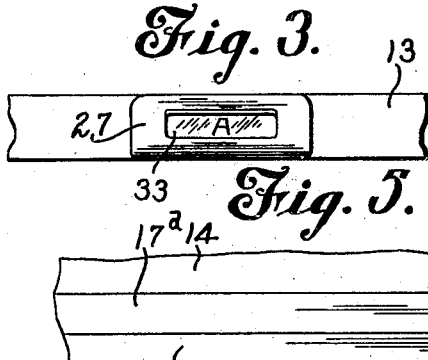
Fig. 3 is an enlarged partial front view of the drawer or tray of Fig. 2, and a front view of the handle member applied thereto.
Fig. 4 is an enlarged side view of the parts shown in Fig. 3.
Figure 5:
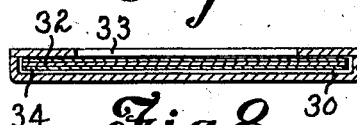
Fig. 5 is an enlarged partial plan view of the front end of the drawer or tray and the handle member.

The index equipment selected to illustrate the embodiment of my invention comprises a cabinet 10, suitably constructed to allow the storing away of a plurality of drawers or trays 11, such as shown in Figs. 2 and 12.

The drawer or tray 11, as illustrated, comprises a sheet metal structure having vertically extending flanged sides 12, which are integral with the bottom portion 14, being bent up therefrom, then inwardly over the drawer, and then returned back upon themselves outwardly and downwardly as at 12ª. Preferably, a strip of material bent in L-form in cross section, is inserted between the side portions 12 and 12ª to strengthen the same longitudinally. A drawer front plate 13 is provided for the drawer, which is vertically disposed and extends from one drawer side portion 12 to the other, and which braces the drawer transversely against distortion at the front edge thereof. This plate has one of its edges bent under the bottom portion 14, as at 13ª, where it is secured thereto by suitable means, such as by spot welding, and the other edge bent backwardly over the drawer to form a flanged top edge 13ᵇ for the drawer. The rear edge of the drawer bottom is bent angularly upwardly as at 14ª to brace the same transversely at this point. A plurality of suitable transversely disposed index card supporting strips 15 are provided, suitably secured to the drawer bottom 14, which are adapted to slidably retain a plurality of index cards 16, which in this instance are of the type shown in the above mentioned Fisher patent, and are arranged in overlapped relation with a margin 50 of each exposed to view. Flange members 17 and 17ª are provided, which extend substantially from one side of the drawer to the other, and are secured therein in position to engage the edges of the cards 16.

The flange members 17 are of a novel form, whereby provision is made for the protection of the cards 16, each being constructed of a strip of material, preferably sheet-metal, which is formed to provide a base portion 40, by which the member may be secured to the bottom 14 of the drawer by either spot welding, as at 41, or other suitable means, a vertical card edge abutment or web portion 42, a card edge protecting flange portion 43 and a transparent sheath edge retaining socket 44. As illustrated in Figs. 10 and 11, the flange member 17 is bent up substantially at right angles from the horizontally disposed base 40 to form the abutment 42, then bent horizontally to continue in the same direction as the base, but away therefrom to form the flange 43, and then returned back upon itself, forming a rounded edge 45 and the sheath socket 44. The card flange 43 and the sheath socket 44 are terminated short of both of the ends of the member 17 a sufficient distance to avoid the drawer side flanges 12, as shown respectively at 46 and 47, so that the cards 16 and the sheath 48 may be readily inserted in their proper positions. The cards 16 are engaged upon the strip 15, in this instance by means of struck-out tongues, and have one of their side edges located below the flange 43 of the flange member 17, the other edge being substantially in abutment with the web portion 42 of an adjacent member 17. The flange 43, therefore, acts as a retaining means to hold the cards downwardly and flatwise against the drawer bottom, while the web 42 assists the strip 15 to hold the cards against twisting or other movement out of their proper position. The card-protecting sheath 48 is preferably transparent and is slipped into place by inserting one edge into the socket 44, and the other edge beneath the flange 43 of an adjacent member 17. By the use of a flange member 17, as illustrated and above described, a plurality of series of index cards may be filed in a drawer with the side edges of adjacent series in close proximity without interference therebetween, whereby considerable space is saved in the drawer and the various series are held compactly together and free from interference by a partition between the drawers, or by the upper or lower drawer. By the use of the sheath member 48, the cards are protected from dust and finger marks or other injury, due to handling.

The drawers 11 are as shallow as is practicable, in most cases being only slightly higher than the height of the series of superimposed cards therein. In this manner a large number of drawers may be stored into a cabinet of relatively small dimensions, thereby providing room for a considerable number of index cards. The card supports 15 obviously may extend longitudinally of the drawer, if such a position is desired, as shown in Fig. 12.

Figures 6, 8:
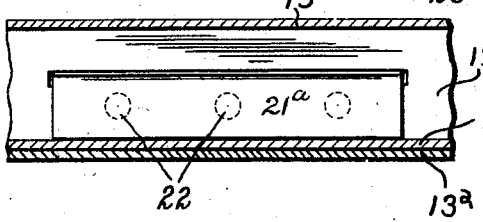
Fig. 6 is a section through the handle member, on line 6—6 of Fig. 4.
Fig. 8 is a section on line 8—8 of Fig. 7.
Figure 7:
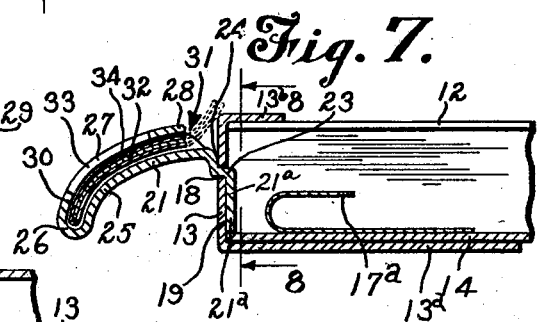
Fig. 7 is a section through the handle member on line 7—7 of Fig. 5.

Each drawer is provided with a sheet-metal handle member 20, having a handle portion 21 and a base portion 21ª. The base portion 21ª is formed by bending downwardly an edge of the sheet metal whereby the same may be secured to the drawer front face plate 13 by threading it through an elongated slot 18, suitably located in said front plate. The base portion 21ª may then be welded or otherwise secured against the inner surface 19 of the plate, preferably in a plurality of places, as shown at 22 in Fig. 8.

The handle or gripping portion 21 is formed as follows: The metal which extends through the plate horizontally, as at 23, is bent upwardly to form the shoulder 24 which rests against the outer surface of the plate 13. The metal is then curved outwardly and downwardly as at 25, to a point slightly above the level of the drawer bottom 14, where it is turned as at 26 and curved upwardly and back upon the portion 25 to form an upper or top portion 27. The metal forming the top portion 27, which terminates at 28, is limited in its upward extension so that it is slightly below the level of the upper edge of the drawer front plate 13. At each side of the portion 25 and integral therewith is an ear 29 which is turned upwardly and supports and spaces the portion 27 from the portion 25. These ears or side portions 29 also act as transverse strengthening flanges to insure that the curved shape of the handle portion 21 is retained.

Figure 1:
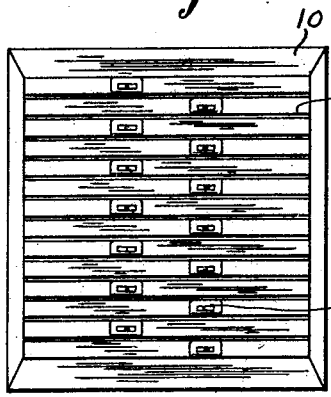
Fig. 1 is a front elevation of an index cabinet of a type adapted to receive the drawers of this invention.

The handle member 20 when formed as described above, produces and provides a useful and efficient device having a handle portion 21, which is easily grasped by the index finger and thumb of the user, and which is limited in vertical extension both upwardly and downwardly in respect to the levels of the top and bottom of the drawer so that it is not liable to be interfered with by the drawer above or below when these are withdrawn. Preferably, the handles on adjacent drawers are located thereon in staggered relation, as shown in Fig. 1.

The bottom portion 25, top portion 27, and the side ears 29 of the handle portion 21 form a pocket 30 therein, which has a mouth opening 31 located closely adjacent the upper edge of the front plate 13, formed between the termination 28 of the portion 27 and the front plate 13. An indicia-bearing slip 32 is located within the pocket 30, and may be observed by the user through a suitably provided window opening 33, formed in the top portion 27. Preferably, the slip 32 is covered with a transparent sheath 34 to protect the surface thereof, the sheath shown being folded about the slip 32.

The indicia upon the slip 32, due to the upwardly curved form of the portion 27, which is also given to the slip 32 when it is inserted in the pocket 30, are plainly visible to an observer either by looking directly toward the front of the drawer or directly down upon the face of the drawer, which feature allows the cabinet to be located with respect to the user in a variety of positions. The handle member, therefore, aside from its value and usefulness as a handle for shallow drawers, is also adapted for use as an indicia tab holder, and, therefore, forms an economically manufactured combined handle and tab holder. Due to the particular form of the handle member a strong and sturdy handle is provided, and because of the manner of attaching the same to the drawer there is little likelihood of its becoming loose or of bending under normal strains.

While I have shown and described a preferred embodiment of my invention, it will be understood that the same is not limited thereto in all of its details, but is capable of many modifications and variations which will fall within the spirit of the invention and the scope of the appended claims.

What I claim is:

1. A handle for a drawer having a front face plate provided with an opening, said handle comprising a single piece of material, a portion of which constitutes a base, and another portion a handle, said base being adapted to pass through the opening in the drawer front plate and be secured thereto, said handle portion being bent upwardly along said front plate and then extending from said front plate, being curved outwardly and downwardly therefrom.

2. A handle for a drawer or the like comprising a one-piece sheet metal structure having one end turned downwardly to form a base portion adapted to be inserted through an opening in the front face plate of said drawer and be secured to the inner face thereof, a horizontally disposed portion lying in the opening, a portion turned upwardly along the outer face of the front plate and an outwardly and downwardly curved portion constituting a hand gripping portion extending from said last-named portion, and an upwardly turned ear along each side of said hand gripping portion to rigidly brace the same against distortion.

3. A handle for a shallow drawer, comprising a one-piece sheet-metal structure having a turned down base portion, and an outwardly and downwardly curved handle portion, said handle portion being provided with a pocket for receiving and mounting an insignia bearing slip thereon.

4. A handle for a shallow drawer, comprising a one-piece sheet-metal structure having one end formed to provide a turned down base portion, and having the opposite end formed into an outwardly and downwardly curved handle portion, said handle portion provided with spaced apart top and bottom walls provided by said last-named end for forming a pocket to receive an insignia bearing slip.

5. A handle for a shallow drawer, comprising a one-piece sheet metal structure having one end formed to provide a turned down base portion and having the opposite end formed into an outwardly and downwardly curved handle portion, said handle portion being provided with spaced apart top and bottom walls and side closure members forming a pocket to receive an insignia-bearing slip.

6. A handle for shallow drawers, comprising a piece of sheet metal having one end turned downwardly to form a base portion, and an intermediate portion curved outwardly and downwardly to form a hand gripping portion and having the other end turned back upon the intermediate portion to form a pocket for receiving an insignia bearing slip.

7. A handle for a shallow drawer, comprising a piece of sheet metal having one end turned downwardly to form a base portion, and an intermediate portion curved outwardly and downwardly to form a handle gripping portion and having the other end turned back upon the intermediate portion, and an ear extending upwardly from each side of said handle gripping portion to space the back-turned portion therefrom whereby a pocket is formed for receiving an insignia bearing slip.

8. A handle for a drawer having a front face plate, said handle comprising a one-piece sheet metal structure having one end inserted through an opening in the front plate of said drawer and turned downwardly for securing the same to the inner surface thereof, and being curved from the front face of the front plate outwardly and downwardly and then back upon itself to a point spaced from the outer surface of the front plate, thereby forming a pocket having a mouth adjacent the upper front edge of the front plate for the insertion of an insignia bearing slip therein.

9. A handle for a drawer provided with a front face member, said handle comprising a one-piece sheet metal structure having one end inserted through an opening in the drawer front member and turned downwardly for securing the same to the inner surface thereof, and being curved from the front face of said member outwardly and downwardly and then back upon itself to a point spaced from the outer surface of the member, thereby forming a pocket having a mouth adjacent the upper front edge of the member for the insertion of an insignia bearing slip therein, said turned back portion being spaced from the intermediate portion by ears upturned from the side edges of said intermediate portion.

10. A handle for a drawer provided with a front face plate, said handle comprising a one-piece sheet metal structure having one end inserted through an opening in the front plate and turned downwardly for securing the same to the inner surface thereof, and being curved from the front face of said plate outwardly and downwardly to a point slightly above the level of the lower edge of said plate, and then back upon itself to a point slightly below the level of the upper edge of said plate and spaced from the outer surface thereof, thereby forming a pocket having a mouth adjacent the upper front edge of said plate for the insertion of an insignia bearing slip therein.

In witness whereof, I have hereunto set my hand this 7th day of November, 1924.

WILLIAM H. DAY.